United States Patent
Lin et al.

(10) Patent No.: US 12,069,857 B2
(45) Date of Patent: Aug. 20, 2024

(54) MEMORY CELL, MEMORY DEVICE MANUFACTURING METHOD AND MEMORY DEVICE OPERATION METHOD THEREOF

(71) Applicant: MACRONIX INTERNATIONAL CO., LTD., Hsinchu (TW)

(72) Inventors: Yu-Hsuan Lin, Taichung (TW); Feng-Min Lee, Hsinchu (TW); Po-Hao Tseng, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 40 days.

(21) Appl. No.: 17/408,535

(22) Filed: Aug. 23, 2021

(65) Prior Publication Data
US 2023/0065465 A1   Mar. 2, 2023

(51) Int. Cl.
*H10B 41/35* (2023.01)
*H01L 21/28* (2006.01)
*H01L 29/66* (2006.01)

(52) U.S. Cl.
CPC ........ *H10B 41/35* (2023.02); *H01L 29/40114* (2019.08); *H01L 29/66825* (2013.01)

(58) Field of Classification Search
None
See application file for complete search history.

(56) References Cited

U.S. PATENT DOCUMENTS

| | | | |
|---|---|---|---|
| 10,141,065 B1 | 11/2018 | Danon et al. | |
| 10,332,599 B2 | 6/2019 | Menezes et al. | |
| 11,164,976 B2 | 11/2021 | Ramamoorthy et al. | |
| 11,537,754 B1 * | 12/2022 | Jameson | G11C 13/0069 |
| 2006/0203552 A1 | 9/2006 | Chen et al. | |
| 2011/0008945 A1 * | 1/2011 | Lee | H10B 63/30 257/E21.003 |
| 2012/0092935 A1 * | 4/2012 | Kim | G11C 13/0002 365/158 |
| 2018/0019252 A1 | 1/2018 | Li et al. | |
| 2020/0192753 A1 * | 6/2020 | Akerib | G11C 7/1006 |

FOREIGN PATENT DOCUMENTS

| | | |
|---|---|---|
| TW | 201931579 A | 8/2019 |
| TW | I676177 B | 11/2019 |
| TW | 202105684 A | 2/2021 |

* cited by examiner

*Primary Examiner* — Xiaoming Liu
(74) *Attorney, Agent, or Firm* — McClure, Qualey & Rodack, LLP

(57) ABSTRACT

The application discloses an integrated memory device, a manufacturing method and an operation method thereof. The integrated memory cell includes: a first memory cell; and an embedded second memory cell, serially coupled to the first memory cell, wherein the embedded second memory cell is formed on any one of a first side and a second side of the first memory cell.

6 Claims, 23 Drawing Sheets

MEMORY CELL, MEMORY DEVICE MANUFACTURING METHOD AND MEMORY DEVICE OPERATION METHOD THEREOF

TECHNICAL FIELD

The disclosure relates in general to a memory cell, a manufacturing method and an operation method for a memory device, and more particularly to a memory cell integrating a flash memory cell and an embedded nonvolatile memory cell, a manufacturing method and an operation method for a memory device.

BACKGROUND

NOR Flash memory has advantages of random access, short read times and zero bit error rate (BER), which makes it ideal for data storage.

Embedded NVM (nonvolatile memory) has advantages of random access, low fabrication cost and lower operation power consumption.

Flash memory cells may be single-level cells (SLC), multi-level cells (MLC) or higher-level cells. It needs several read operations to read the flash memory having multi-states, which leads longer read time. For example, in reading MLC, it needs two read times. Besides, NOR flash memory is usually implemented by SLC for high data storage reliability.

Thus, it is beneficial to have a multi-state memory cell having both advantages of the flash memory cell and the embedded NVM cell, which takes one read time in reading multi-state of the memory cell.

SUMMARY

According to one embodiment, provided is an integrated memory cell including: a first memory cell; and an embedded second memory cell, serially coupled to the first memory cell, wherein the embedded second memory cell is formed on any one of a first side and a second side of the first memory cell.

According to another embodiment, provided is a manufacturing method for a memory device, the manufacturing method including: forming a plurality of first memory cells; forming a plurality of contacts; and forming a plurality of embedded second memory cells on any one of a first side and a second side of the first memory cells.

According to yet another embodiment, provided is an operation method for a memory device including a plurality of integrated memory cells each having a first memory cell and an embedded second memory cell, the operation method including: in performing a first programming operation on the first memory cell, for a selected integrated memory cell, applying a first programming voltage to a first terminal of the integrated memory cell; and in performing a second programming operation on the embedded second memory cell, for the selected integrated memory cell, applying a second programming voltage to the first terminal of the integrated memory cell and applying a third programming voltage to a second terminal of the integrated memory cell.

Figure 1:
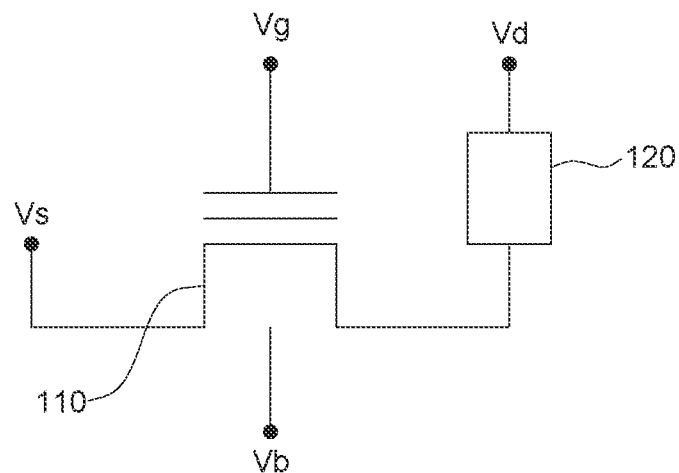
FIG. 1 shows an integrated memory cell having multiple storage states according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows an integrated memory cell having multiple storage states according to one embodiment of the application. The integrated memory cell 100 having multiple storage states according to one embodiment of the application includes a first memory cell 110 and an embedded second memory cell 120. In the following, for example but not limited by, the first memory cell 110 and the embedded second memory cell 120 are a flash memory cell and an embedded nonvolatile memory (NVM) cell, respectively. The flash memory cell 110 includes a gate terminal, a drain terminal, a source terminal and a bulk terminal. The embedded nonvolatile memory (NVM) cell 120 includes a first terminal and a second terminal. The flash memory cell 110 and the embedded nonvolatile memory (NVM) cell 120 are serially coupled. The integrated memory cell 100 includes four terminals, a first terminal (the gate terminal of the flash memory cell 110), a second terminal (the first terminal of the embedded nonvolatile memory (NVM) cell 120), a third terminal (the source terminal of the flash memory cell 110) and a fourth terminal (the bulk terminal of the flash memory cell 110). The drain terminal of the flash memory cell 110 is coupled to the second terminal of the embedded nonvolatile memory (NVM) cell 120. Voltages applied to the first terminal, the second terminal, the third terminal and the fourth terminal of the integrated memory cell 100 are referred as a first terminal voltage Vg (or said a gate voltage), a second terminal voltage Vd (or said a drain voltage), a third terminal voltage Vs (or said a source voltage) and a fourth terminal voltage Vb (or said a bulk voltage).

In one embodiment of the application, the flash memory cell 110 is for example but not limited by, a charge storage memory cell (for example a floating gate flash memory cell), a charge trapping memory cell (for example a Silicon-Oxide-Nitride-Oxide-Silicon (SONGS) memory cell) or a ferroelectric-gated field-effect-transistor (FeFET) memory cell.

In one embodiment, the embedded NVM cell 120 is for example but not limited by, a resistive random-access memory (RRAM or ReRAM) cell, a conductive-bridging random access memory (OBRAM) cell, a phase change memory (PCM) cell, a Magnetoresistive Random Access Memory (MRAM) cell and a ferroelectric tunnel junction (FTJ) memory cell.

Figure 2A:
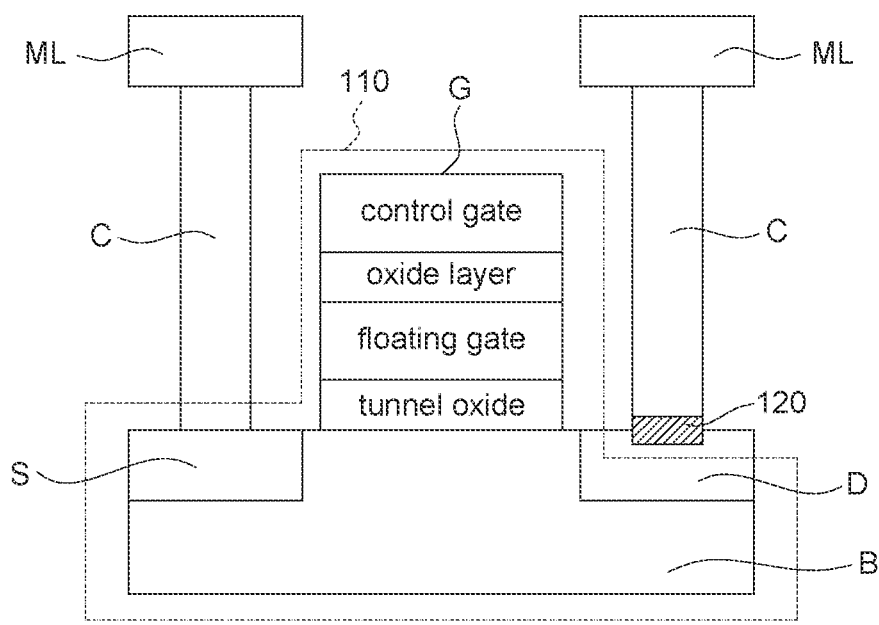
FIG. 2A to FIG. 2C show cross-section views of the integrated memory cell according to several embodiments of the application.
Figure 2B:
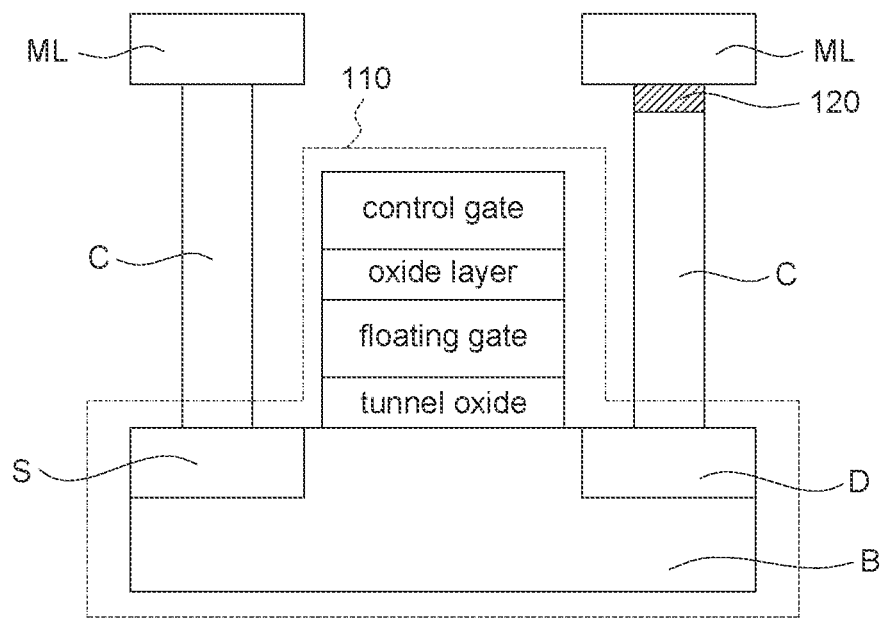
Figure 2C:
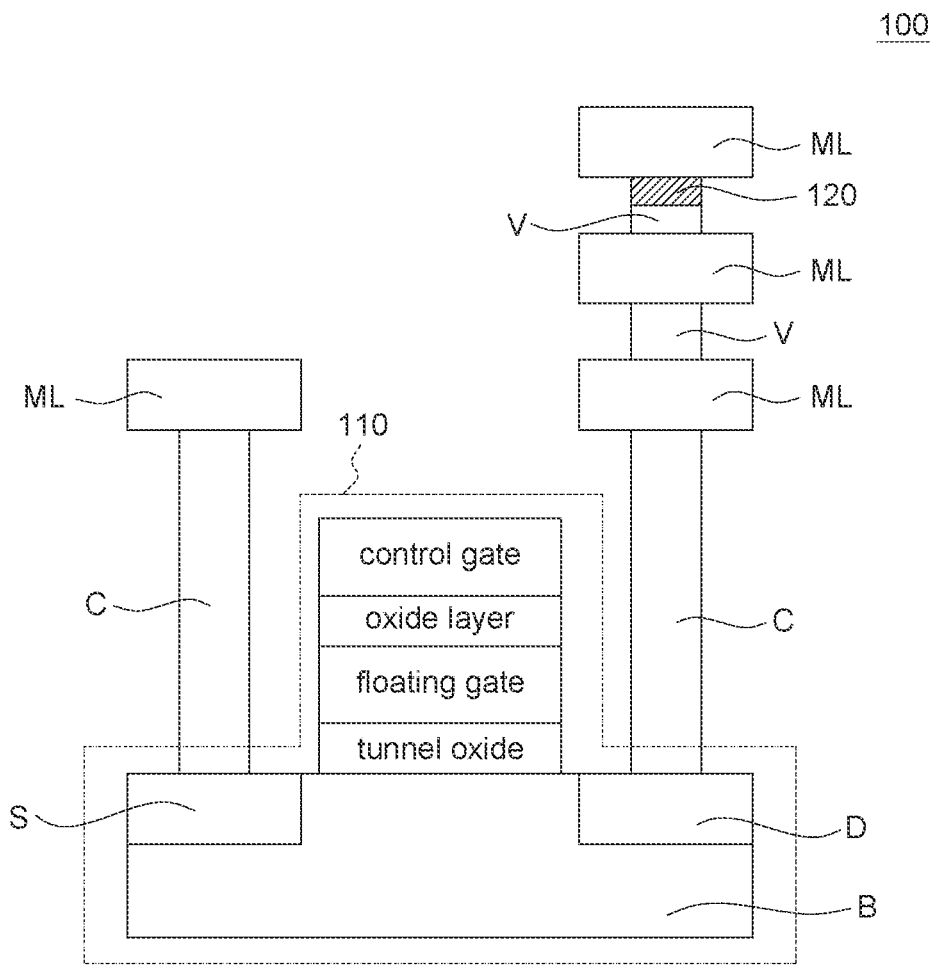

FIG. 2A to FIG. 2C show cross-section views of the integrated memory cell 100 according to several embodiments of the application. In one embodiment of the application, the embedded NVM cell 120 may be formed at any side of a drain side or a source side of the flash memory cell 110. In the following, forming the embedded NVM cell at the drain side of the flash memory cell 110 is taken as an example. One skilled person in the art would understand how to form the embedded NVM cell at the source side of the flash memory cell 110. The gate terminal G of the flash memory cell 110 includes a control gate, an oxide layer, a floating gate and a tunnel oxide. Further, "B" refers to the bulk or the substrate and "ML" refers to a metal line.

As shown in FIG. 2A, the embedded NVM cell 120 is formed at a bottom of a contact C. As shown in FIG. 2B, the embedded NVM cell 120 is formed at a top of the contact C. As shown in FIG. 2C, the embedded NVM cell 120 is formed at a top of a via V. In other embodiment, the embedded NVM cell 120 is formed at a bottom of a via V, which is still within the spirit and the scope of the application.

Figure 3A:
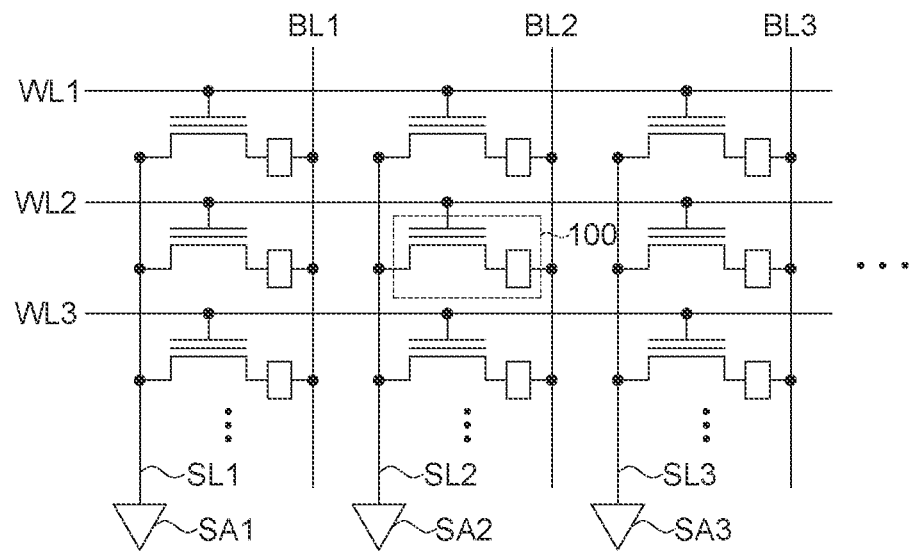
FIG. 3A and FIG. 3B show two circuit structure of a memory array according to one embodiment of the application.
Figure 3B:
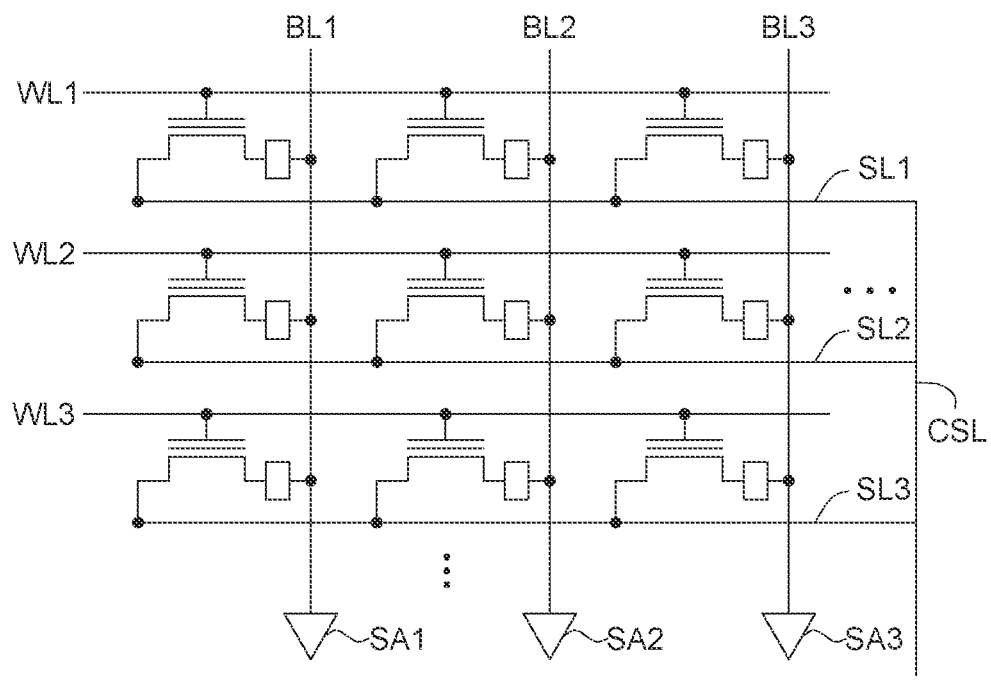

FIG. 3A and FIG. 3B show two circuit structure of a memory array according to one embodiment of the application.

As shown in FIG. 3A, a memory array 300A is an AND-type array. The memory array 300A includes: a plurality of integrated memory cells 100 arranged in an array, a plurality of word lines (for example but not limited by WL1-WL3), a plurality of bit lines (for example but not limited by BL1-BL3), a plurality of source lines (for example but not limited by SL1-SL3) and a plurality of sensing amplifiers (for example but not limited by SA1-SA3).

As shown in FIG. 3B, a memory array 300B is an NOR-type array. The memory array 300B includes: a plurality of integrated memory cells 100 arranged in an array, a plurality of word lines (for example but not limited by WL1-WL3), a plurality of bit lines (for example but not limited by BL1-BL3), a plurality of source lines (for example but not limited by SL1-SL3), a common source line CSL and a plurality of sensing amplifiers (for example but not limited by SA1-SA3).

Figure 4A:
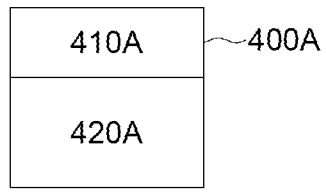
FIG. 4A and FIG. 4B show two kinds of memory arrays according to one embodiment of the application.
Figure 4B:
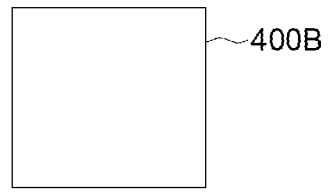

FIG. 4A and FIG. 4B show two kinds of memory arrays according to one embodiment of the application. As shown in FIG. 4A, a memory array 400A includes memory sub-arrays 410A and 420A. Each memory cell of the memory sub-array 410A includes the flash memory cell 110 and the embedded NVM cell 120. Each memory cell of the memory sub-array 420A includes the flash memory cell 110 (but not the embedded NVM cell 120).

As shown in FIG. 4B, each memory cell of the memory array 400B includes the flash memory cell 110 and the embedded NVM cell 120.

Figure 5:
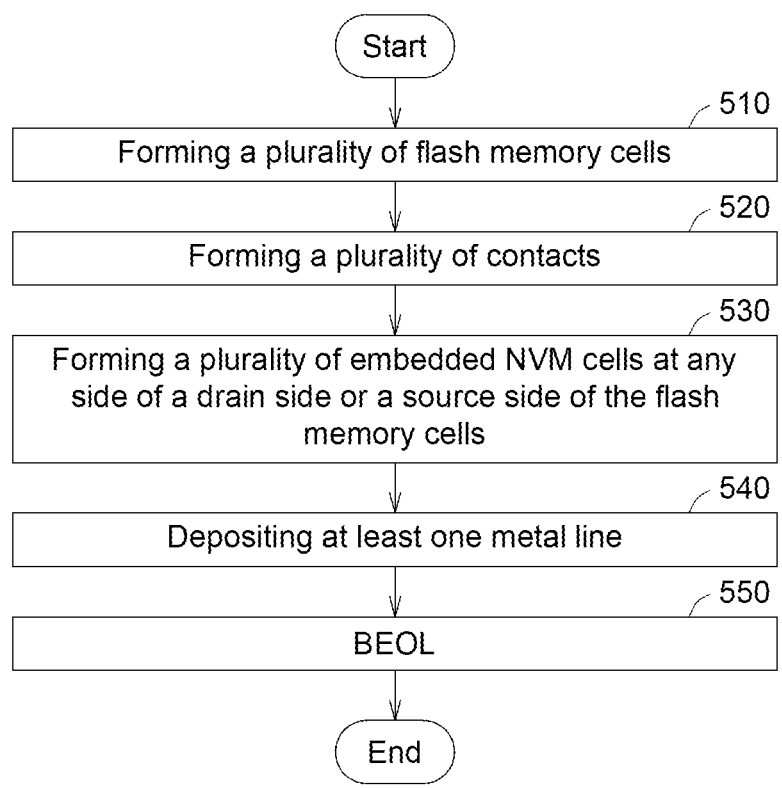
FIG. 5 shows a manufacturing flow of a memory device according to one embodiment of the application.

FIG. 5 shows a manufacturing flow of a memory device according to one embodiment of the application. In step 510, a FEOL (Front End of Line) operation is performed to form a plurality of flash memory cells. In step 520, a plurality of contacts are formed. In step 530, a plurality of embedded NVM cells are formed at any side of a drain side or a source side of the flash memory cells. In step 540, at least one metal line is deposited. In step 550, a BEOL (Back End of Line) operation is performed.

Details of forming the embedded NVM cells (i.e. details of the step 530) are described. Refer to FIG. 6A to FIG. 6D and FIG. 7A to FIG. 7D.

FIG. 6A to FIG. 6D shows manufacturing flow for forming the embedded NVM cell according to one embodiment of the application. In here, the embedded NVM cell is for example but not limited by a ReRAM cell.

Figure 6A:
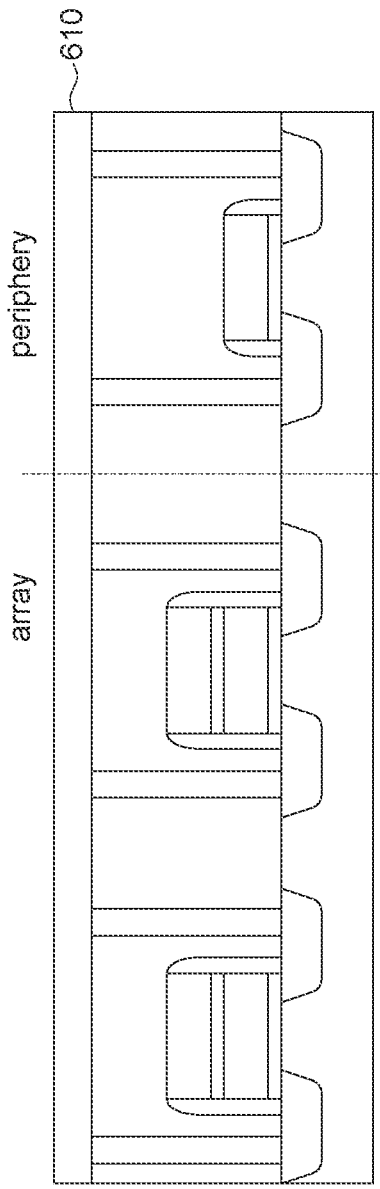
FIG. 6A to FIG. 6D shows manufacturing flow for forming the embedded NVM cell according to one embodiment of the application.
Figure 6B:
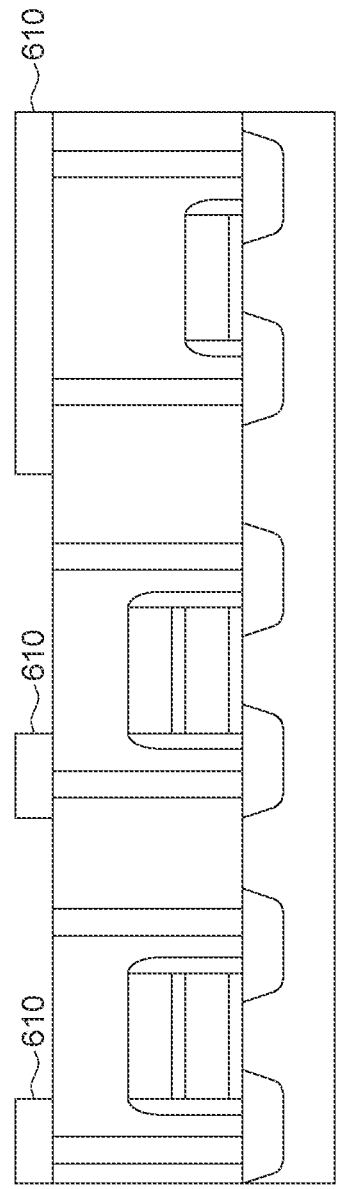
Figure 6C:
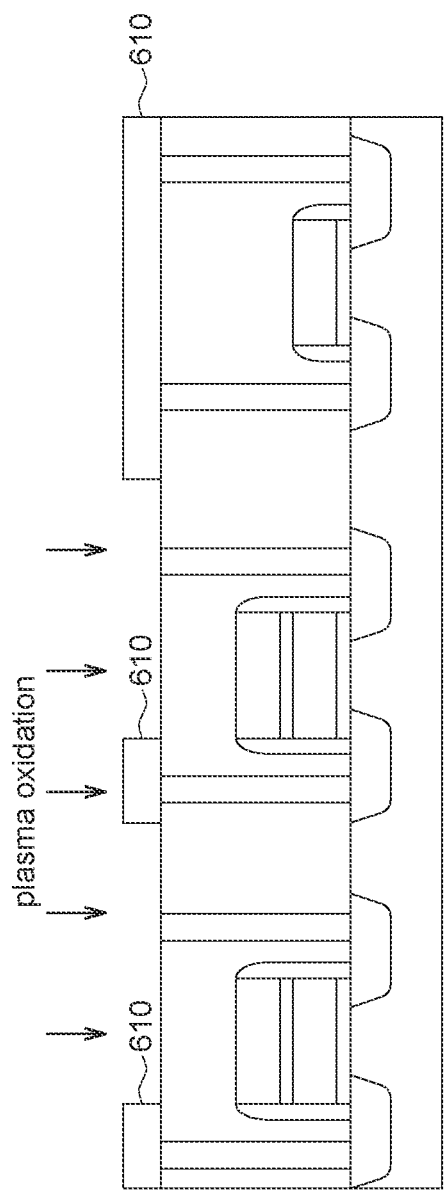
Figure 6D:
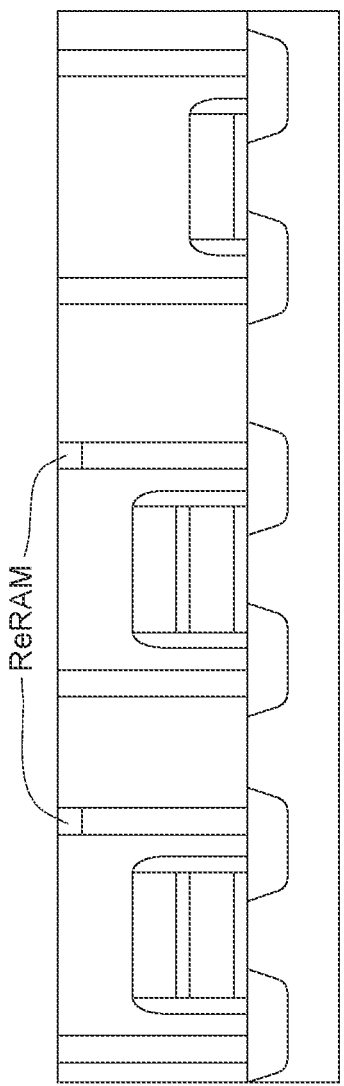

In FIG. 6A, a photo resistor (PR) layer 610 is deposited on the flash memory cells. In FIG. 6B, the RP layer 610 is etched to open the PR layer 610 in the contact region on the drain side (or the source side) of the flash memory cells. In FIG. 6C, the plasma oxidation is performed to form the embedded NVM cells (for example but not limited by, ReRAM cells) on the drain side (or the source side) of the flash memory cells. In FIG. 6D, the PR layer 610 is removed.

FIG. 7A to FIG. 7D shows manufacturing flow for forming the embedded NVM cell according to one embodiment of the application. In here, the embedded NVM cell is for example but not limited by a ReRAM cell.

Figure 7A:
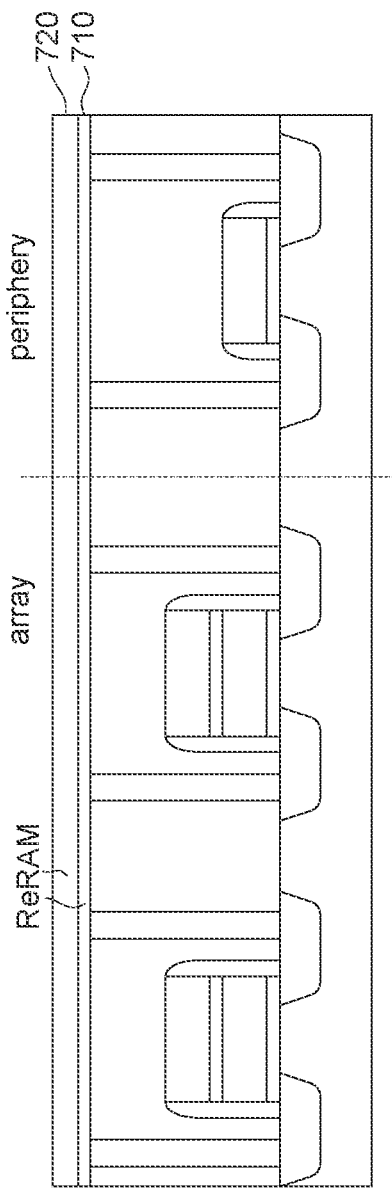
FIG. 7A to FIG. 7D shows manufacturing flow for forming the embedded NVM cell according to one embodiment of the application.
Figure 7B:
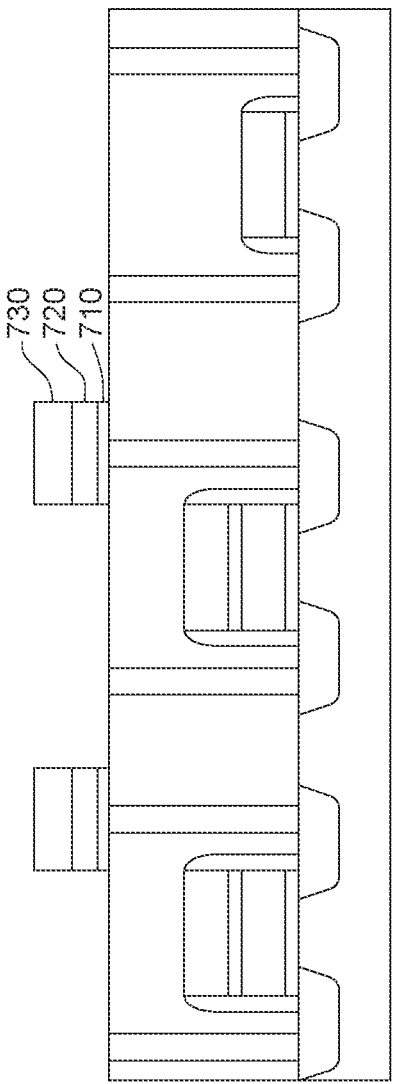
Figure 7C:
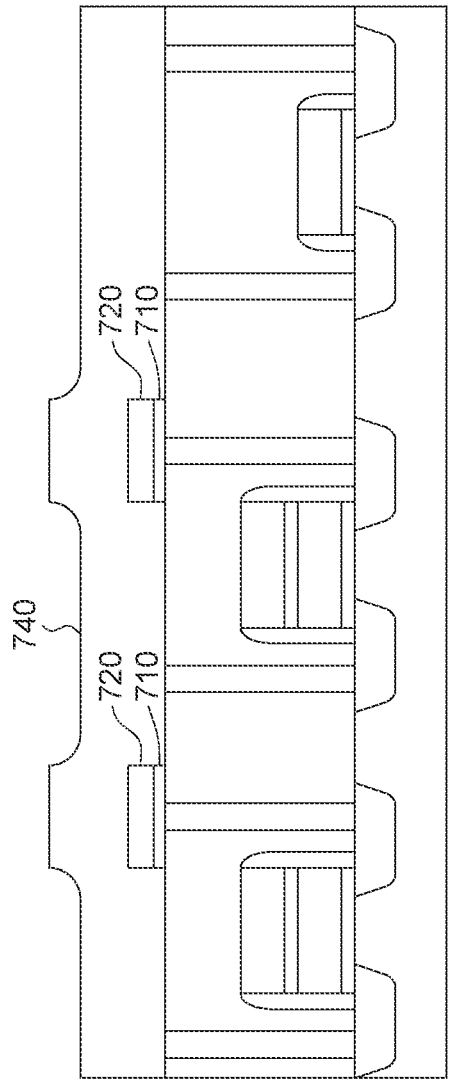
Figure 7D:
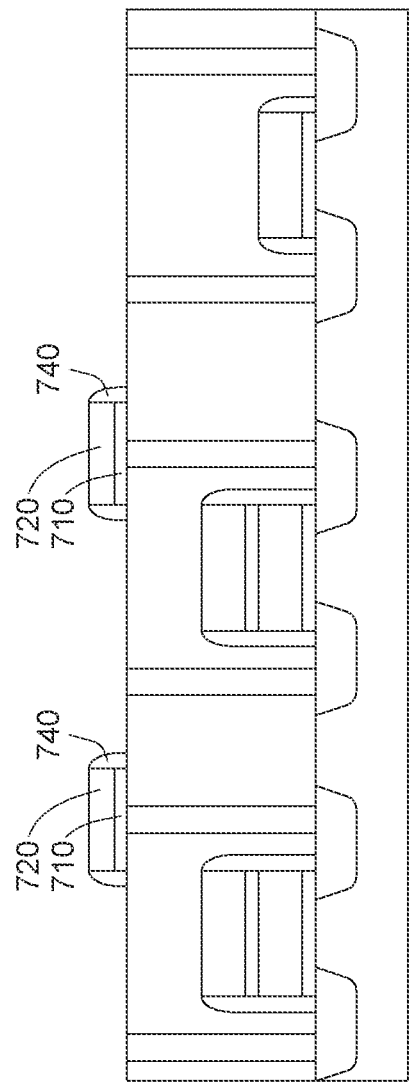

In FIG. 7A, a ReRAM film 710 and a top electrode layer 720 are deposited on the flash memory cells. In FIG. 7B, a PR layer 730 is deposited on the top electrode layer 720 and the PR layer 730 is etched to open the PR layer 730 in the contact region on the drain side (or the source side) of the flash memory cells. In FIG. 7C, the PR layer 730 is removed and a protection layer (for example but not limited, SiN or $SiO_2$) 740 is deposited. In FIG. 7D, the protection layer 740 is etched to form side wall protection.

Figure 8A:
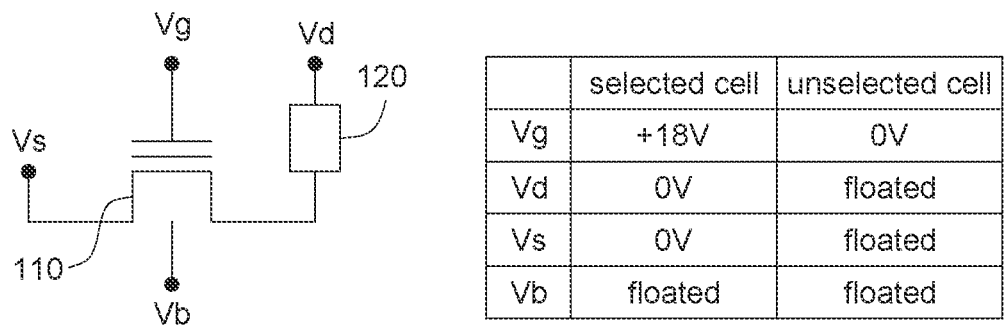
FIG. 8A to FIG. 8D shows an operation method for a memory device according to one embodiment of the application, which is suitable for an AND-type array (FIG. 3A).
Figure 8A:
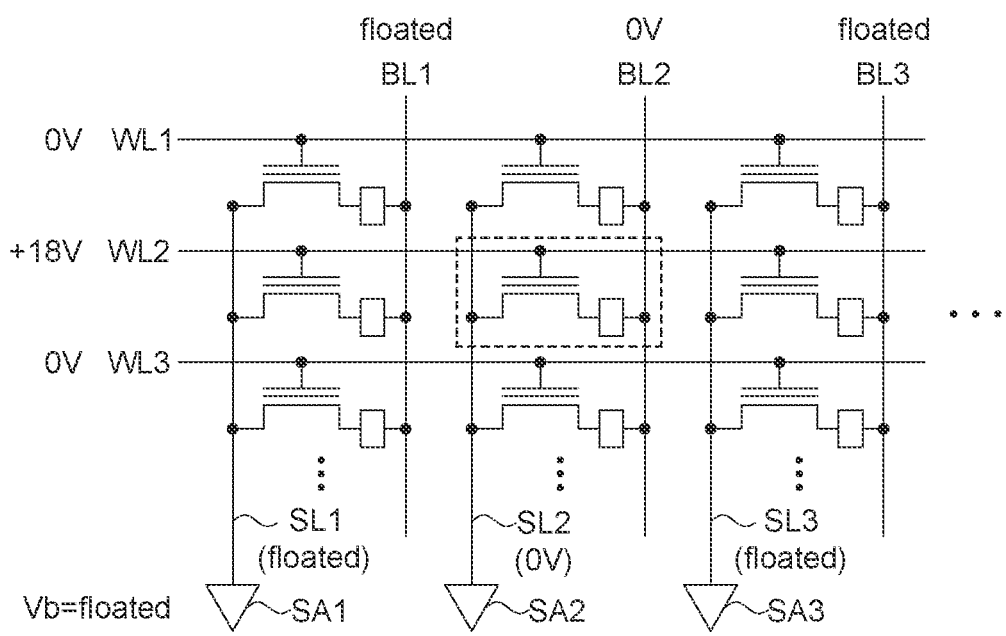
Figure 8B:
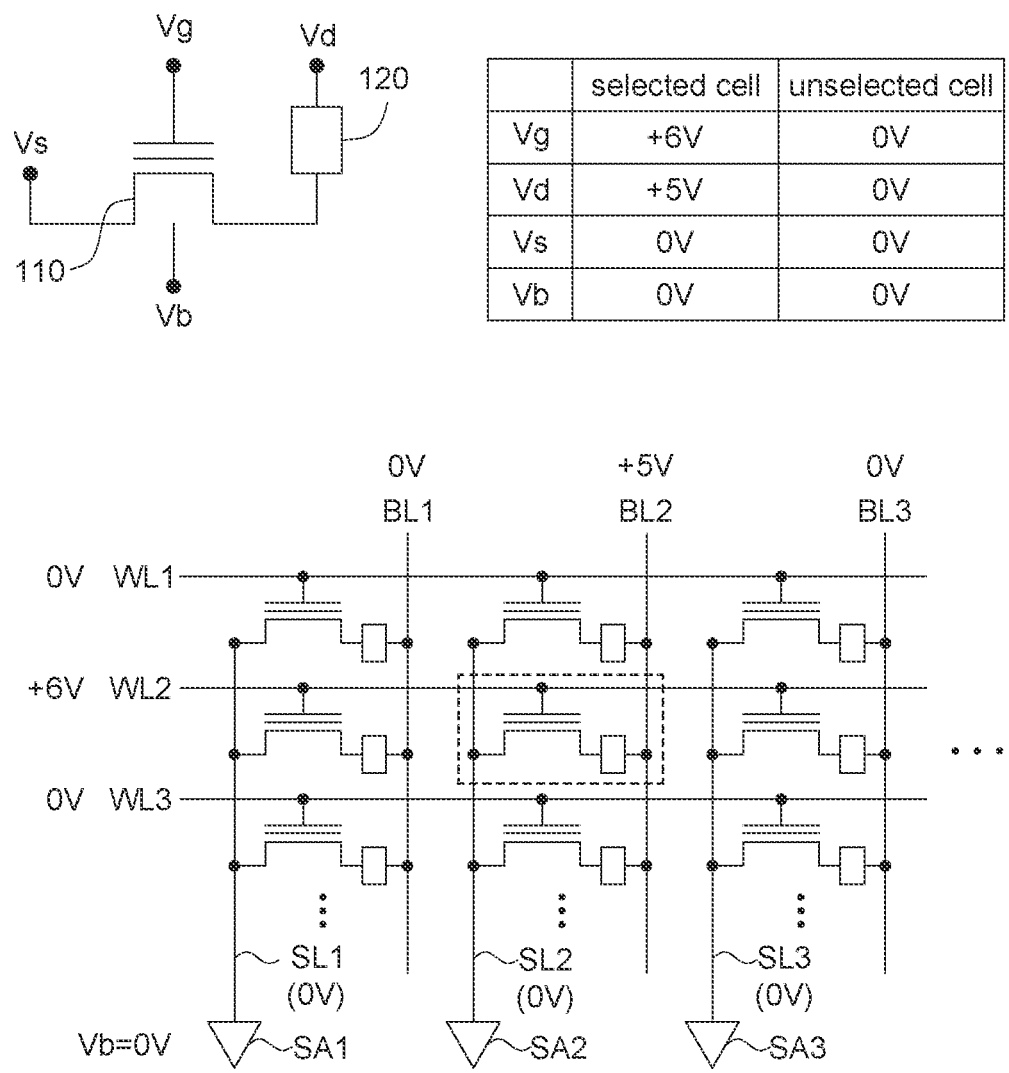
Figure 8C:
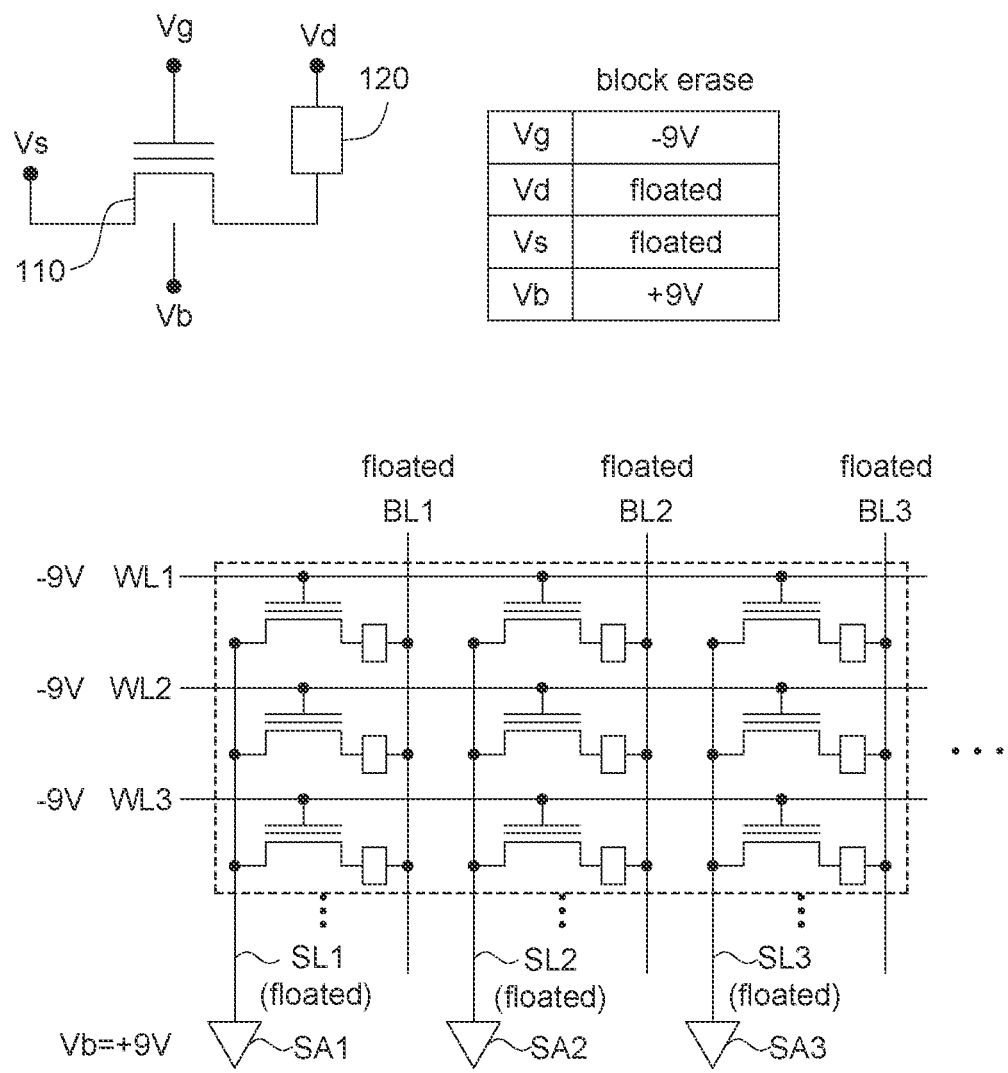
Figure 8D:
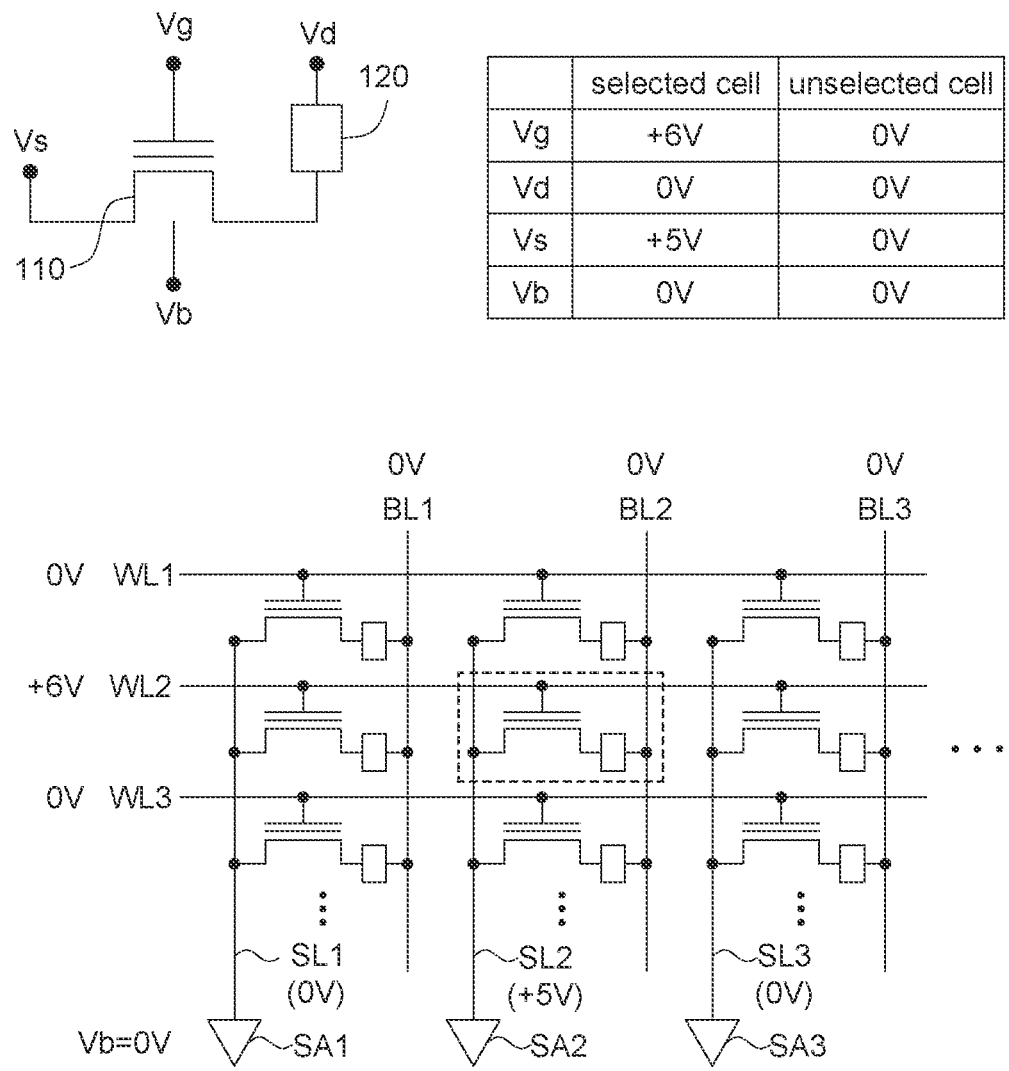

FIG. 8A to FIG. 8D shows an operation method for a memory device according to one embodiment of the application, which is suitable for an AND-type array (FIG. 3A). FIG. 8A shows programming operations to the flash memory cells; FIG. 8B shows programming operations to the embedded NVM cells; FIG. 8C shows block erasing operations to the flash memory cells; and FIG. 8D shows erasing operations to the embedded NVM cells. In FIG. 8A to FIG. 8D, the programming operations to the flash memory cells are independent to the programming operations to the embedded NVM cells; and the block erasing operations to the flash memory cells are also independent to the erasing operations to the embedded NVM cells.

In FIG. 8A, in the programming operations to the flash memory cells, for the selected memory cell, the gate voltage Vg is a first programming voltage (for example but not limited by, +18V), the drain voltage Vd and the source voltage Vs are 0V and the bulk voltage Vb is floated; and for the unselected memory cells, the gate voltage Vg is 0V, and the drain voltage Vd, the source voltage Vs and the bulk voltage Vb are floated.

In FIG. 8B, in the programming operations to the embedded NVM cells, for the selected cell, the gate voltage Vg is a second programming voltage (for example but not limited by, +6V), the drain voltage Vd is a third programming voltage (for example but not limited by, +5V), the source voltage Vs and the bulk voltage Vb are 0V; and for the unselected cells, the gate voltage Vg, the drain voltage Vd, the source voltage Vs and the bulk voltage Vb are 0V.

In FIG. 8C, in the block erasing operations to the flash memory cells, the gate voltage Vg is a first erase voltage (for example but not limited by, −9V), the drain voltage Vd and the source voltage Vs are floating and the bulk voltage Vb is a second erase voltage (for example but not limited by, +9V).

In FIG. 8D, in the erasing operations to the embedded NVM cells, for the selected cell, the gate voltage Vg is a third erase voltage (for example but not limited by, +6V), the source voltage Vs is a fourth erase programming voltage (for example but not limited by, +5V), the drain voltage Vd and the bulk voltage Vb are 0V; and for the unselected cells, the gate voltage Vg, the drain voltage Vd, the source voltage Vs and the bulk voltage Vb are 0V.

Figure 9A:
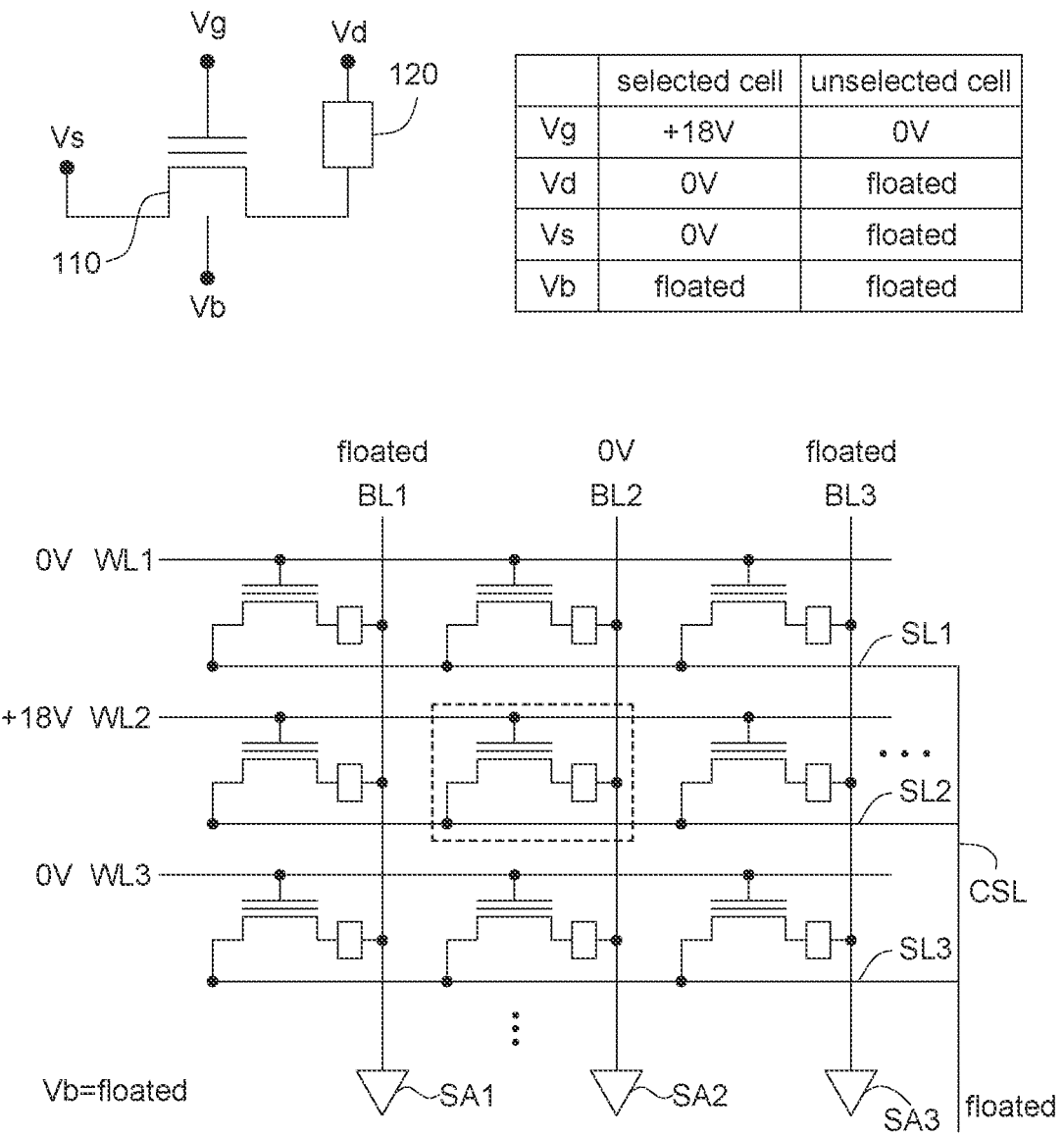
FIG. 9A to FIG. 9D show an operation method for a memory device according to one embodiment of the application, which is suitable for NOR-type memory array (FIG. 3B).
Figure 9B:
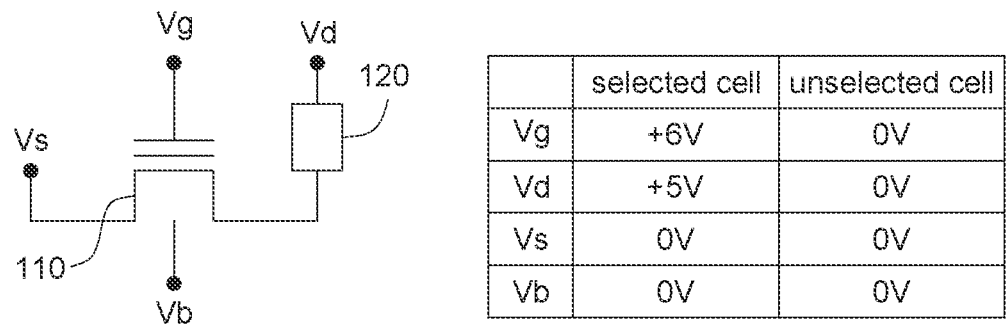
Figure 9B:
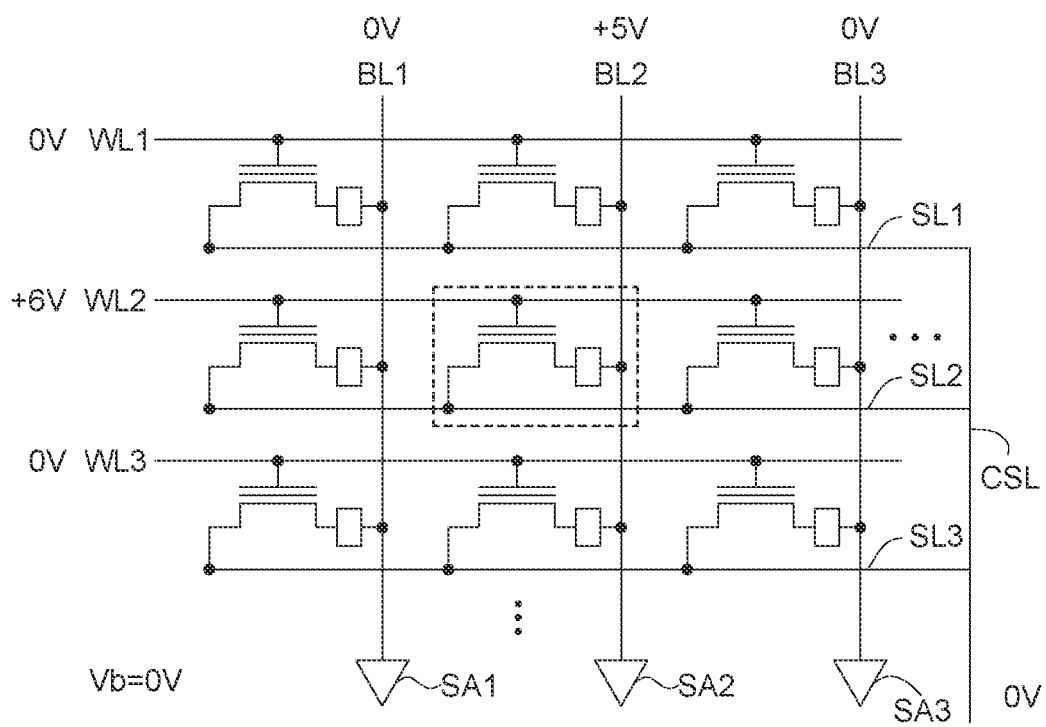
Figure 9C:
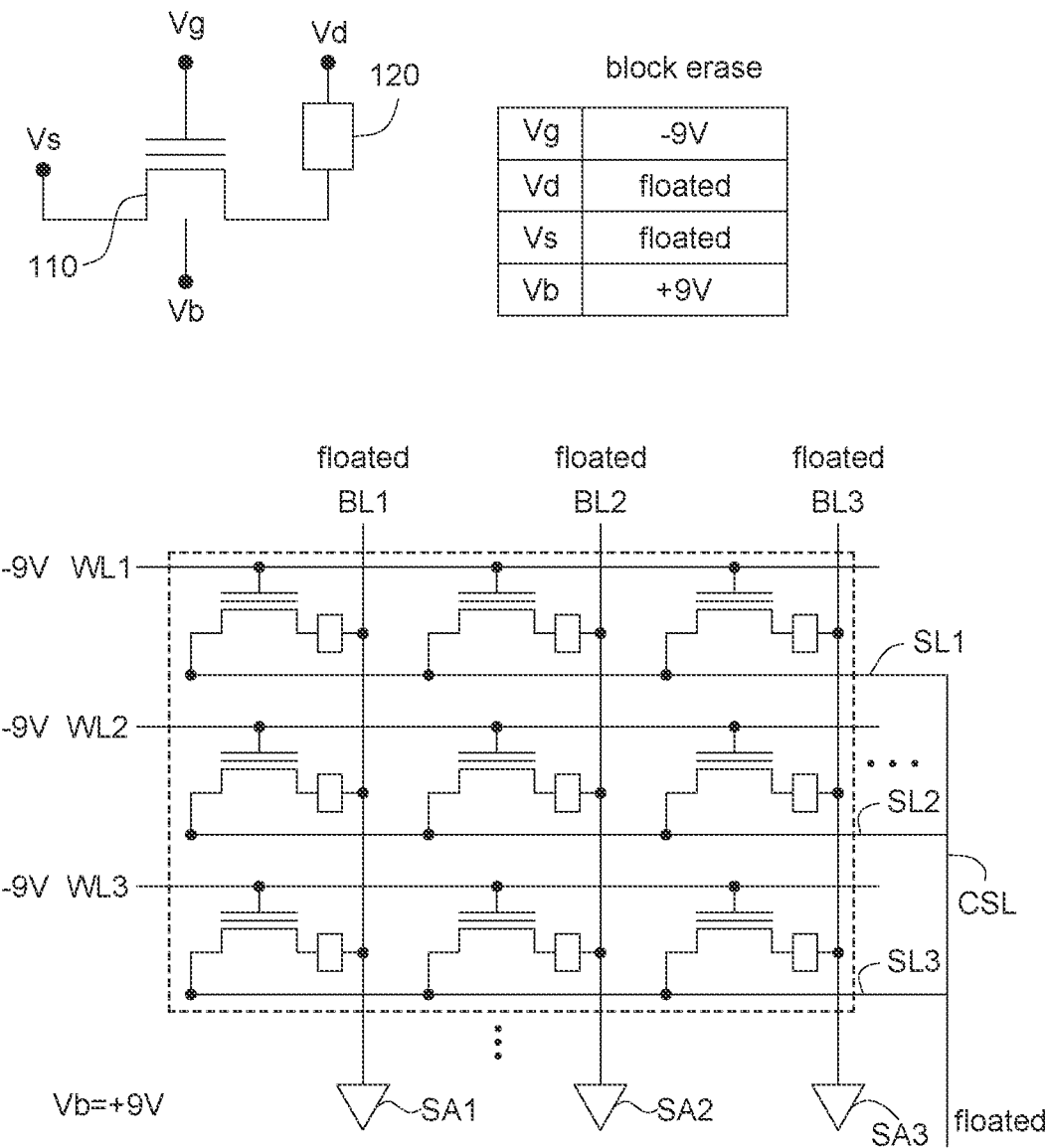
Figure 9D:
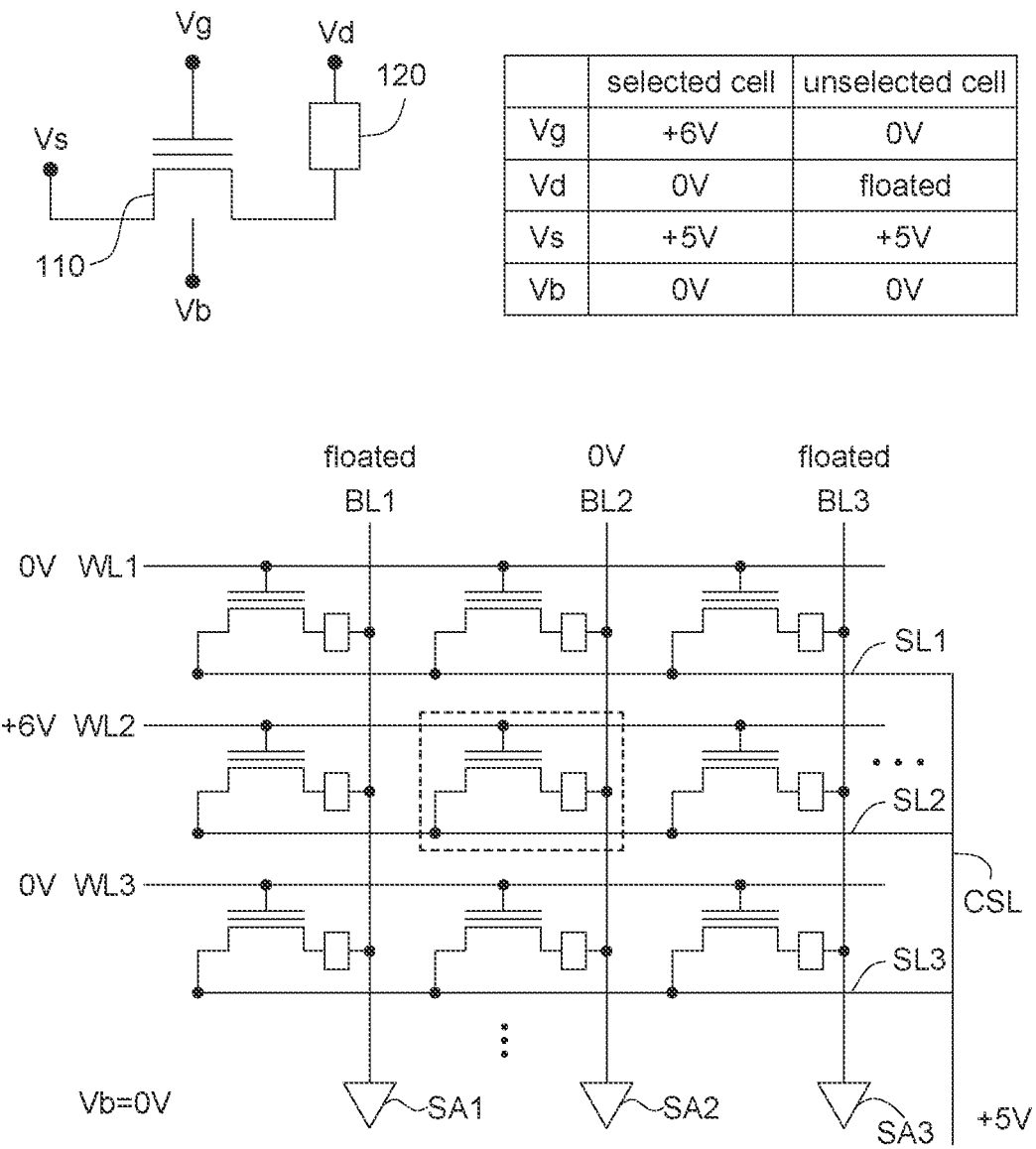

FIG. 9A to FIG. 9D show an operation method for a memory device according to one embodiment of the application, which is suitable for NOR-type memory array (FIG. 3B). FIG. 9A shows programming operations to the flash memory cells; FIG. 9B shows programming operations to the embedded NVM cells; FIG. 9C shows block erasing operations to the flash memory cells; and FIG. 9D shows erasing operations to the embedded NVM cells. In FIG. 9A to FIG. 9D, the programming operations to the flash memory cells are independent to the programming operations to the embedded NVM cells; and the block erasing operations to the flash memory cells are also independent to the erasing operations to the embedded NVM cells.

In FIG. 9A, in the programming operations to the flash memory cells, for the selected memory cell, the gate voltage Vg is the first programming voltage (for example but not limited by, +18V), the drain voltage Vd is 0V, the source voltage Vs and the bulk voltage Vb are floated; and for the unselected memory cells, the gate voltage Vg is 0V, and the drain voltage Vd, the source voltage Vs and the bulk voltage Vb are floated.

In FIG. 9B, in the programming operations to the embedded NVM cells, for the selected cell, the gate voltage Vg is the second programming voltage (for example but not limited by, +6V), the drain voltage Vd is the third programming voltage (for example but not limited by, +5V), the source voltage Vs and the bulk voltage Vb are 0V, and for the unselected cells, the gate voltage Vg, the drain voltage Vd, the source voltage Vs and the bulk voltage Vb are 0V.

In FIG. 9C, in the block erasing operations to the flash memory cells, the gate voltage Vg is the first erase voltage (for example but not limited by, −9V), the drain voltage Vd and the source voltage Vs are floating and the bulk voltage Vb is the second erase voltage (for example but not limited by, +9V).

In FIG. 9D, in the erasing operations to the embedded NVM cells, for the selected cell, the gate voltage Vg is the third erase voltage (for example but not limited by, +6V), the source voltage Vs is the fourth erase programming voltage (for example but not limited by, +5V), the drain voltage Vd and the bulk voltage Vb are 0V; and for the unselected cells; the gate voltage Vg and the bulk voltage Vb are 0V, the drain voltage Vd is floating and the source voltage Vs is the fourth erase voltage.

Figure 10:
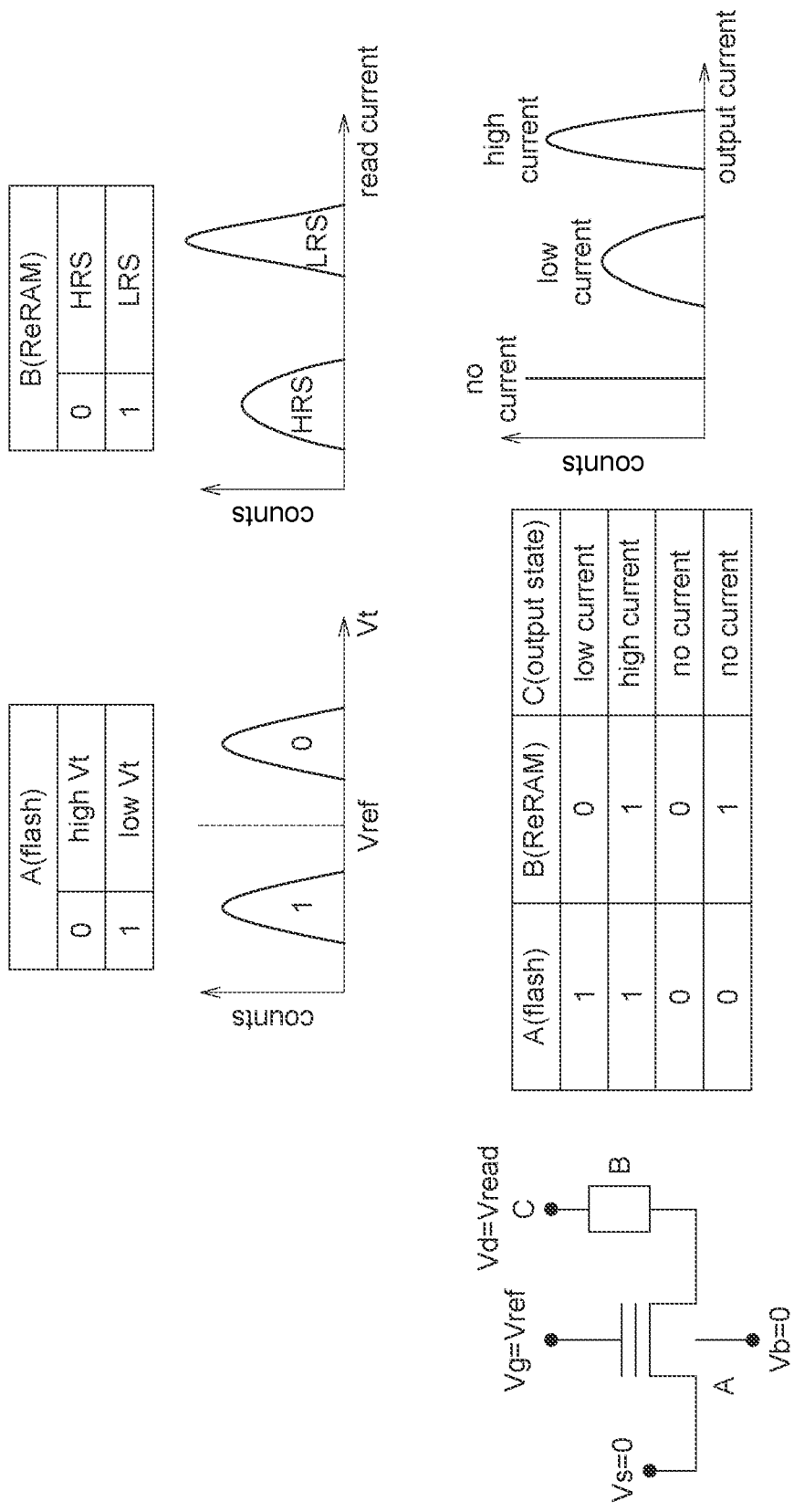
FIG. 10 shows reading operations of the memory device according to one embodiment of the application.

FIG. 10 shows reading operations of the memory device according to one embodiment of the application. The flash memory cell and the embedded NVM cell (for example but not limited by, a ReRAM cell) are both SLC (single-level cell) but the integrated memory cell 100 generate 3-level output current. In FIG. 10, "A", "B" and "C" refer to the SLC flash memory cell, the SLC embedded NVM cell, and the three-level output current (i.e. the output).

The flash memory cell (A) has logic 1 and logic 0 storage states. When the flash memory cell (A) is programmed as high threshold voltage; the flash memory cell (A) stores logic 0; and when the flash memory cell (A) is programmed as low threshold voltage, the flash memory cell (A) stores logic 1.

The ReRAM (B) has logic 1 and logic 0 storage states. When the ReRAM (B) is programmed as high resistance state (HRS), the ReRAM (B) stores logic 0; and when the ReRAM (B) is programmed as low resistance state (LRS), the ReRAM (B) stores logic 1.

In reading, the gate voltage Vg is the reference voltage Vref (between the high threshold voltage and the low threshold voltage of the flash memory cell (A)), the source voltage Vs is 0V, the drain voltage Vd is a read voltage Vread and the bulk voltage Vb is 0V. Based on the storage states of the flash memory cell (A) and the ReRAM (B), the sensed output current has three levels, i.e. low current, high current and no current.

When the flash memory cell (A) is programmed as low threshold voltage, due to the gate voltage Vg is the reference voltage Vref (between the high threshold voltage and the low threshold voltage of the flash memory cell (A)), the flash memory cell (A) is turned on and thus the output current (C) is based on the resistance value of the ReRAM (B). When the ReRAM (B) is at HRS (ReRAM (B) storing logic 0), the output current (C) is low current: and when the ReRAM (B) is at LRS (ReRAM (B) storing logic 1), the output current (C) is high current.

Besides, when the flash memory cell (A) is programmed at the high threshold voltage, due to the gate voltage Vg is the reference voltage Vref (between the high threshold voltage and the low threshold voltage of the flash memory cell (A)), the flash memory cell (A) is turned off and thus there is no current.

Thus, from FIG. 10, in one embodiment of the application, the SLC flash memory cell and the SLC embedded NVM cell are integrated to generate three-level output current.

Figure 11A:
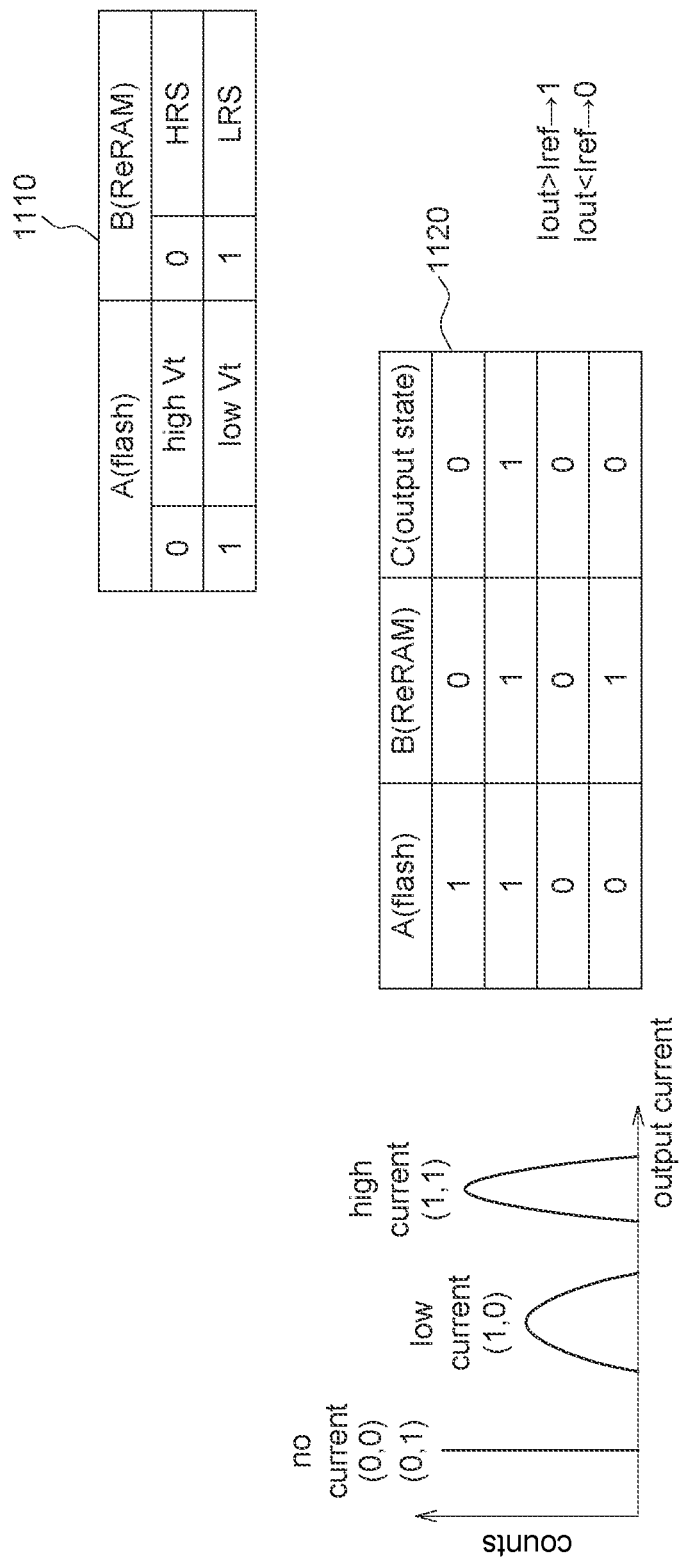
FIG. 11A shows the integrated memory cell according to one embodiment of the application executing logic AND operations.
Figure 11B:
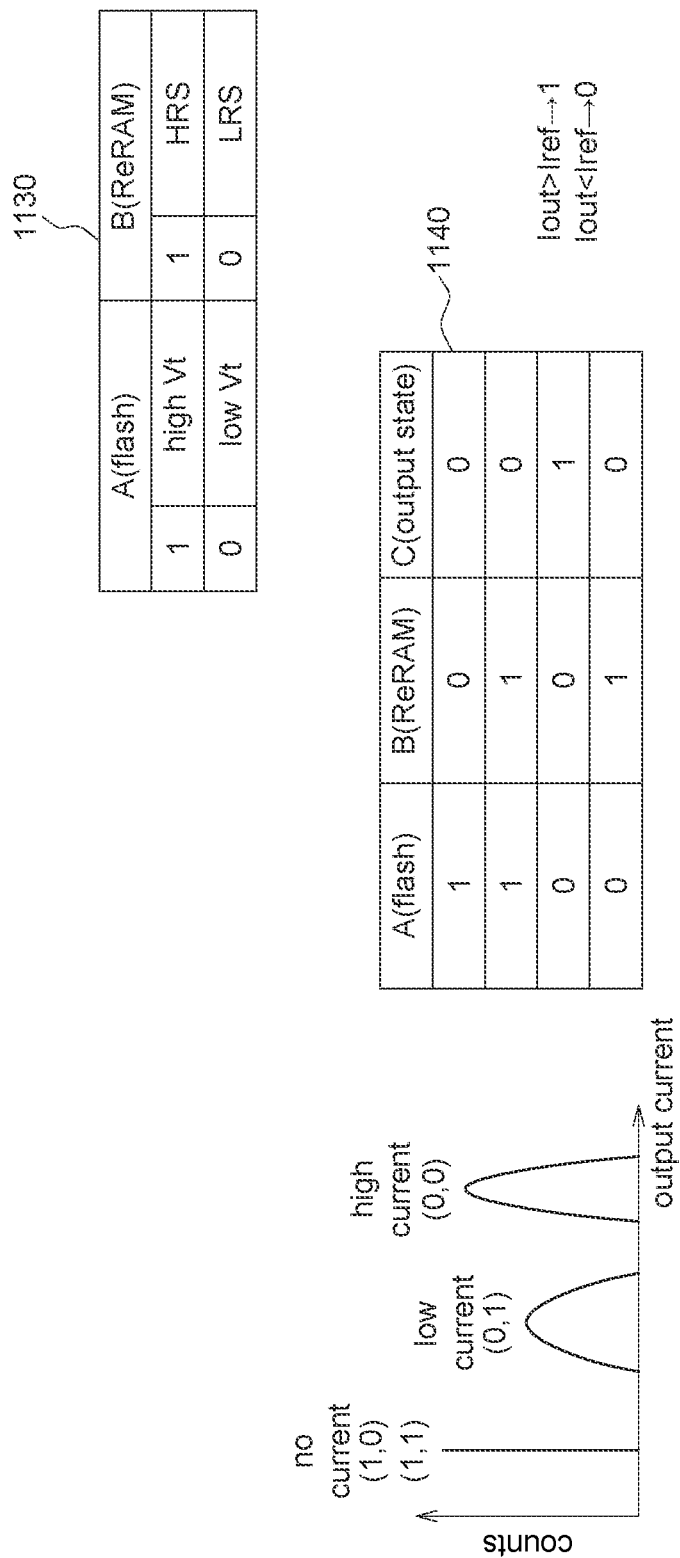
FIG. 11B shows the integrated memory cell according to one embodiment of the application executing logic NOR operations.

Still further, the integrated memory cell 100 according to one embodiment of the application executes logic AND operations and logic NOR operations. FIG. 11A shows the integrated memory cell executing logic AND operations according to one embodiment of the application. FIG. 11B shows the integrated memory cell executing logic NOR operations according to one embodiment of the application.

Refer to FIG. 10 and FIG. 11A. The value of the reference output current Iref is set to be between the low output current and the high output current. When the output current is higher than the reference output current Iref, the output state is defined as logic 1; and when the output current is lower than the reference output current Iref, the output state is defined as logic 0. The logic 1 and logic 0 of the flash memory cell (A) and the ReRAM (B) are set in the table 1110 and thus, the output state (C) is shown in the table 1120.

When the flash memory cell (A) is logic 1 (the flash memory cell (A) is turned on) and the ReRAM (B) is logic 0 (the ReRAM (B) is HRS), the output current is low current (lower than the reference output current Iref), and thus the output state C is logic 0.

When the flash memory cell (A) is logic 1 (the flash memory cell (A) is turned on) and the ReRAM (B) is logic 1 (the ReRAM (B) is LRS), the output current is high current (higher than the reference output current Iref), and thus the output state C is logic 1.

When the flash memory cell (A) is logic 0 (the flash memory cell (A) is turned off), no matter the ReRAM (B) is logic 0 or logic 1, there is no output current (lower than the reference output current Iref), and thus the output state C is logic 0.

Thus, from the table 1120, the output state C is a logic AND operation result of the inputs A and B.

Refer to FIG. 10 and FIG. 11B. The value of the reference output current Iref is set to be between the low output current and the high output current. When the output current is higher than the reference output current Iref, the output state is defined as logic 1; and when the output current is lower than the reference output current Iref, the output state is defined as logic 0. The logic 1 and logic 0 of the flash memory cell (A) and the ReRAM (B) are set in the table 1130 and thus, the output state (C) is shown in the table 1140.

When the flash memory cell (A) is logic 0 (the flash memory cell (A) is turned on) and the ReRAM (B) is logic 0 (the ReRAM (B) is LRS), the output current is high current (higher than the reference output current Iref), and thus the output state C is logic 1.

When the flash memory cell (A) is logic 0 (the flash memory cell (A) is turned on) and the ReRAM (B) is logic 1 (the ReRAM (B) is HRS), the output current is low current (lower than the reference output current Iref), and thus the output state C is logic 0.

When the flash memory cell (A) is logic 1 (the flash memory cell (A) is turned off), no matter the ReRAM (B) is logic 0 or logic 1, there is no output current (lower than the reference output current Iref), and thus the output state C is logic 0.

Thus, from the table 1140, the output state C is a logic NOR operation result of the inputs A and B.

In one embodiment of the application, the integrated memory cell has Physically Unclonable Function (PUF).

In order to execute the PUF, the embedded NVM cell 120 is programmed to store random PUF codes; and the flash memory cell 110 is programmed to select or unselect the random PUF codes stored in the embedded NMV cell 120.

For example, in order to execute the PUF, definition of the logic 1 and logic 0 states of the flash memory cell (A) and ReRAM (B) are as the following table:

| flash memory cell (A) | | ReRAM (B) | |
|---|---|---|---|
| 0 | High Vt | 0 | HRS |
| 1 | Low Vt | 1 | LRS |

The output state (or the output current) (C) is as the following table:

| flash memory cell (A) | ReRAM (B) | C (output state or output current) |
|---|---|---|
| 1 | 0 | 0 (Low current) |
| 1 | 1 | 1 (High current) |
| 0 | 0 | No current |
| 0 | 1 | No current |

In order to unselect the random PUF codes stored in the embedded NVM cell 120, the flash memory cell 110 is programmed to high Vt state (OFF state, having high resistance value). Thus, there is no cell current.

In order to select the random PUF codes stored in the embedded NVM cell 120, the flash memory cell 110 is programmed to low Vt state (ON state, having low resistance value). Thus, based on whether the high or low output current is detected, the random PUF code stored in the embedded NVM cell 120 is read out as logic 1 or logic 0.

In one embodiment of the application, the SLC or high-level cell flash memory cell and the SLC or high-level cell embedded NVM cell are combined to implement multi-level cell (MLC) or higher level integrated memory cell.

Figure 12:
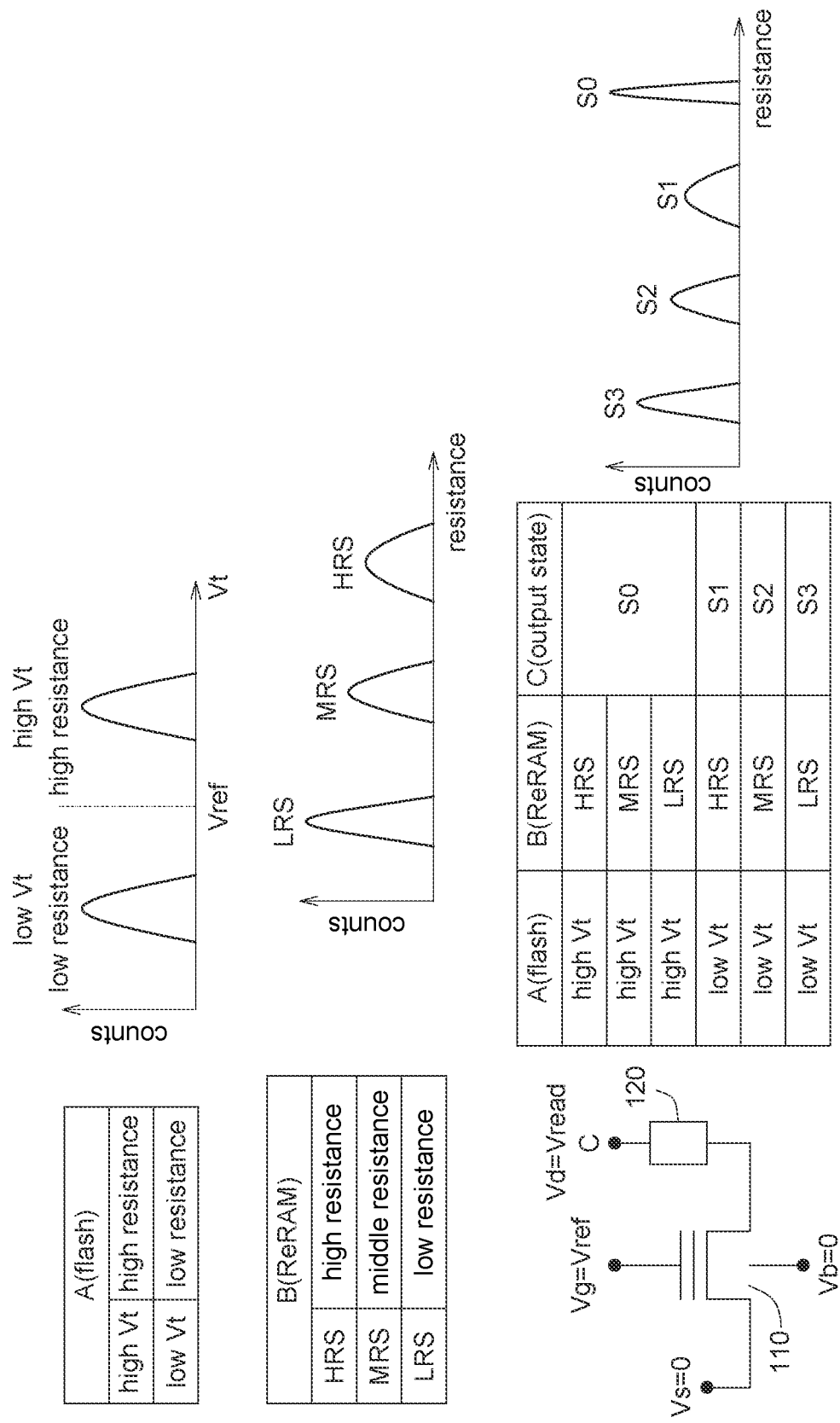
FIG. 12 shows a two level integrated memory cell according to one embodiment of the application.

FIG. 12 shows a two level integrated memory cell according to one embodiment of the application, wherein the SLC flash memory cell and the two-level (multi-level) embedded NVM cell are combined to implement two-level integrated memory cell.

In FIG. 12, when the SLC flash memory cell is programmed into high Vt and low Vt, respectively, the SLC flash memory cell has high resistance and low resistance, respectively. When the two-level (multi-level) embedded NVM cell is programmed into HRS, MRS (middle resistance state) and LRS, respectively, the two-level (multi-level) embedded NVM cell has high resistance, middle resistance and low resistance, respectively.

In reading, the gate voltage Vg is as the reference voltage Vref (Vg=Vref) and the drain voltage Vd is as the read voltage Vread (Vd=Vread).

When the SLC flash memory cell is programmed into high Vt (the SLC flash memory cell has high resistance), no matter the two-level (multi-level) embedded NVM cell is programmed into HRS, MRS or LRS, the output state (the output current) is no current (i.e. the state 0 (S0)).

When the SLC flash memory cell is programmed into low Vt (the SLC flash memory cell has low resistance) and the two-level (multi-level) embedded NVM cell is programmed into HRS, the output state is state 1 (S1)).

When the SLC flash memory cell is programmed into low Vt (the SLC flash memory cell has low resistance) and the two-level (multi-level) embedded NVM cell is programmed into MRS, the output state is state 2 (S2)).

When the SLC flash memory cell is programmed into low Vt (the SLC flash memory cell has low resistance) and the two-level (multi-level) embedded NVM cell is programmed into LRS, the output state is state 3 (S3)).

Wherein, the output current is each state is that S3>S2>S1>S0, i.e. the output current is S3 is higher than the output current is 32, and so on.

The output state has four states, and thus the integrated memory cell is two-level, i.e. the integrated memory cell can store two bits in one single cell.

An example is described in the following which is not to limit the application.

In FIG. 12, when the SLC flash memory cell is programmed as high Vt and low Vt, the SLC flash memory cell has high resistance (100G ohm) and low resistance (5k ohm). When the two-level (multi-level) embedded NVM cell is programmed into HRS, MRS and LRS, respectively, the two-level (multi-level) embedded NVM cell has high resistance (500k ohm), middle resistance (100k ohm) and low resistance (20k ohm), respectively.

The relationship between the flash memory cell, the embedded NVM and the output state is as the following table (the output state and the output current is determined based on the equivalent resistance):

| flash memory cell | embedded NVM (ReRAM) | Equivalent resistance (the output state) |
|---|---|---|
| 100 G ohm (high Vt) | 500k ohm (HRS) | 100 G ohm (S0, no current) |
| 100 G ohm (high Vt) | 100k ohm (MRS) | 100 G ohm (S0, no current) |
| 100 G ohm (high Vt) | 20k ohm (LRS) | 100 G ohm (S0, no current) |
| 5k ohm (low Vt) | 500k ohm (HRS) | 505k ohm (S1, low current) |
| 5k ohm (low Vt) | 100k ohm (MRS) | 105k ohm (S2, middle current) |
| 5k ohm (low Vt) | 20k ohm (LRS) | 25k ohm (S3, high current) |

For example, when the SLC flash memory cell is programmed into high Vt (the SLC flash memory cell has high resistance (100G ohm)) and the two-level embedded NVM cell is programmed into HRS (500k ohm), the equivalent resistance of the integrated memory cell is about 100G ohm and thus the output state is S0 (no current), and so on.

Figure 13:
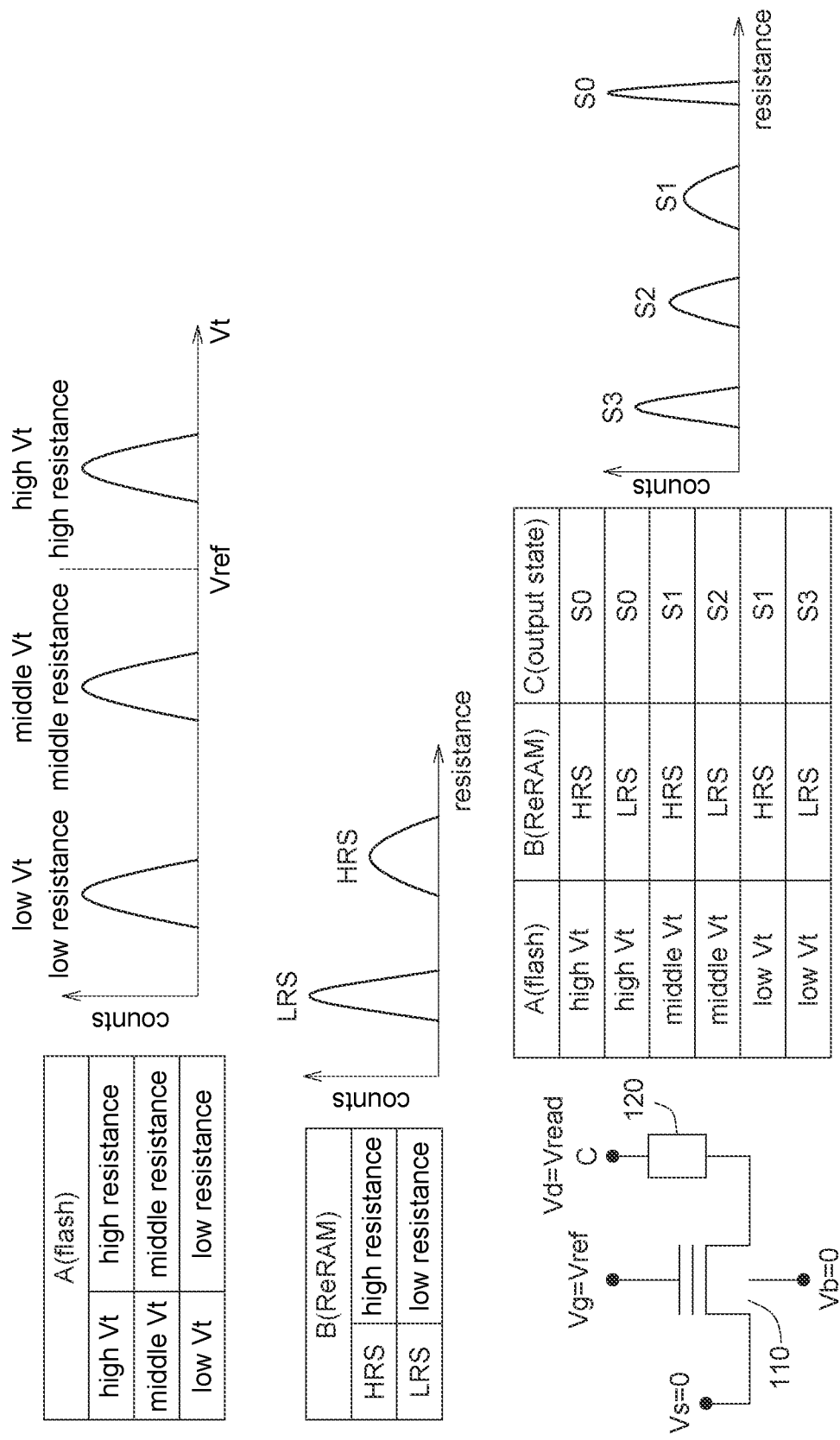
FIG. 13 shows a two level integrated memory cell according to one embodiment of the application.

FIG. 13 shows a two level integrated memory cell according to one embodiment of the application, wherein the two-level (multi-level) flash memory cell and the SLC embedded NVM cell are combined to implement two-level integrated memory cell.

In FIG. 13, when the two-level (multi-level) flash memory cell is programmed into high Vt, middle Vt and low Vt, respectively, the two-level (multi-level) flash memory cell has high resistance, middle resistance and low resistance, respectively. When the SLC embedded NVM cell is programmed into HRS and LRS, respectively, the SLC embedded NVM cell has high resistance and low resistance, respectively.

In reading, the gate voltage Vg is as the reference voltage Vref (Vg=Vref) and the drain voltage Vd is as the read voltage Vread (Vd=Vread).

When the two-level (multi-level) flash memory cell is programmed into high Vt (having high resistance), no matter the SLC embedded NVM cell is programmed into HRS or LRS, the output state (the output current) is no current (i.e. the state 0 (S0)).

When the two-level (multi-level) flash memory cell is programmed into middle Vt (having middle resistance) and the SLC embedded NVM cell is programmed into HRS, the output state is state 1 (S1)).

When the two-level (multi-level) flash memory cell is programmed into middle Vt (having middle resistance) and the SLC embedded NVM cell is programmed into LRS, the output state is state 2 (S2)).

When the two-level (multi-level) flash memory cell is programmed into low Vt (having low resistance) and the SLC embedded NVM cell is programmed into HRS, the output state is state 1 (S1)).

When the two-level (multi-level) flash memory cell is programmed into low Vt (having low resistance) and the SLC embedded NVM cell is programmed into LRS, the output state is state 3 (S3)).

The output state has four states, and thus the integrated memory cell is two-level, i.e. the integrated memory cell can store two bits in one single cell.

An example is described in the following which is not to limit the application.

In FIG. 13, when the two-level flash memory cell is programmed as high Vt, middle Vt and low Vt, the two-level flash memory cell has high resistance (100G ohm), middle resistance (50k ohm) and low resistance (5k ohm). When the SLC embedded NVM cell is programmed into HRS and LRS, respectively, the SLC embedded NVM cell has high resistance (200k ohm) and low resistance (20k ohm), respectively.

The relationship between the flash memory cell, the embedded NVM and the output state is as the following table (the output state and the output current is determined based on the equivalent resistance):

| flash memory cell | embedded NVM (ReRAM) | Equivalent resistance (the output state) |
|---|---|---|
| 100 G ohm (high Vt) | 200k ohm (HRS) | 100 G ohm (S0, no current) |
| 100 G ohm (high Vt) | 20k ohm (LRS) | 100 G ohm (S0, no current) |
| 50k ohm (middle Vt) | 200k ohm (HRS) | 250k ohm (S1, low current) |
| 50k ohm (middle Vt) | 20k ohm (LRS) | 70k ohm (S2, middle current) |
| 5k ohm (low Vt) | 200k ohm (HRS) | 205k ohm (S1, low current) |
| 5k ohm (low Vt) | 20k ohm (LRS) | 25k ohm (S3, high current) |

For example, when the two-level flash memory cell is programmed into high Vt (having high resistance (100G ohm)) and the SLC embedded NVM cell is programmed into HRS (200k ohm), the equivalent resistance of the integrated memory cell is about 100G ohm and thus the output state is S0 (no current), and so on.

From the above description, embodiments of the application integrate the flash memory cell and embedded NVM cell as the integrated memory cell and thus has simple manufacturing process. Further, the integrated memory cell has both advantages of the flash memory cell and embedded NVM cell, wherein the Rash memory has advantages of random access, short read times and zero bit error rate (BER), which makes it ideal for data storage; and the embedded NVM (nonvolatile memory) has advantages of random access, low fabrication cost and lower operation power consumption.

From the above description, the integrated memory device in one embodiment of the application may be NOR-type memory device or AND-type memory device.

From the above description, the integrated memory cell in one embodiment of the application may execute logic AND operations and logic NOR operations, Thus, the integrated memory cell in one embodiment of the application may be used in in-memory-computing.

From the above description, the integrated memory cell in one embodiment of the application may execute PUF and thus suitable in random number generator (RNG) or seeds of the RNG.

From the above description, the integrated memory cell in one embodiment of the application may have at least three output states by using SLC flash memory cell and SLC embedded NVM cell.

From the above description, in one embodiment of the application, SLC or high-level flash memory cell and SLC or high-level embedded NVM cell may be integrated into SLC, MLC, TLC (triple-level cell), QLC (Quad-level cell) or higher level integrated memory cell.

Further, in one embodiment of the application, one read operation is enough in reading output state of two-level or higher level integrated memory cell and thus the reading cycle is short.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An integrated memory cell including:
   a first memory cell; and
   an embedded second memory cell, serially coupled to the first memory cell,
   wherein the embedded second memory cell is formed on any one of a first side and a second side of the first memory cell;
   the embedded second memory cell is formed at a bottom of a contact, or formed at a top or a bottom of a via; and
   the embedded second memory cell is embedded in a source/drain region of the first memory cell, a top surface of the embedded second memory cell is above a top surface of the source/drain region, and a bottom surface of the embedded second memory cell is below the top surface of the source/drain region.

2. The integrated memory cell according to claim 1, wherein the first memory cell is a flash memory cell and the embedded second memory cell is an embedded nonvolatile memory (NVM) cell.

3. The integrated memory cell according to claim 1, wherein the integrated memory cell executes logic AND operations and logic NOR operations.

4. The integrated memory cell according to claim 1, wherein the integrated memory cell executes Physically Unclonable Function (PUF) and is applied in a random number generator (RNG) or seeds of the RNG.

5. The integrated memory cell according to claim 1, wherein the integrated memory cell has at least three output states when the first memory cell and the embedded second memory cell are both SLCs (single-level cells).

6. The integrated memory cell according to claim 1, wherein when the first memory cell is a SLC (single-level cell) or a higher-level cell and the embedded second memory cell is a SLC or a higher-level cell, the integrated memory cell is a SLC, a MLC (multi-level cell), a TLC (triple-level cell), a QLC (Quad-level cell) or a higher-level cell.

* * * * *